(12) United States Patent
Salter et al.

(10) Patent No.: US 10,336,260 B1
(45) Date of Patent: Jul. 2, 2019

(54) DEPLOYABLE RUNNING BOARD

(71) Applicant: Ford Global Technologies, LLC, Dearborn, MI (US)

(72) Inventors: Stuart Salter, White Lake, MI (US); Paul Kenneth Dellock, Northville, MI (US); Terry Lobsinger, Farmington Hills, MI (US); Mark Beilman, South Lyon, MI (US); Aaron Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 15/895,631

(22) Filed: Feb. 13, 2018

(51) Int. Cl.
*B60R 3/02* (2006.01)
*B60R 3/00* (2006.01)
*B60R 1/12* (2006.01)

(52) U.S. Cl.
CPC .............. *B60R 3/02* (2013.01); *B60R 3/002* (2013.01); *B60R 2001/1223* (2013.01)

(58) Field of Classification Search
CPC .... B60R 3/02; B60R 3/002; B60R 2001/1223
USPC ........................................................ 280/166
See application file for complete search history.

(56) References Cited

U.S. PATENT DOCUMENTS

| 5,299,904 | A | * | 4/1994 | Simon ....................... B60R 3/02 414/541 |
| 6,151,539 | A | * | 11/2000 | Bergholz .............. G01S 13/931 340/435 |
| 7,070,194 | B2 | | 7/2006 | Garland et al. |
| 8,601,953 | B2 | | 12/2013 | Hachet et al. |
| 9,174,580 | B2 | * | 11/2015 | Cha .......................... B60R 3/02 |
| 9,443,163 | B2 | * | 9/2016 | Springer .............. G06K 9/4604 |
| 2017/0291551 | A1 | | 10/2017 | Krajenke et al. |
| 2017/0327022 | A1 | | 11/2017 | Rasekhi |

FOREIGN PATENT DOCUMENTS

| CN | 205615419 | 10/2016 | |
| EP | 1787613 | 8/2010 | |
| WO | WO-9806370 A1 * | 2/1998 | ............. A61G 3/061 |

* cited by examiner

*Primary Examiner* — Paul N Dickson
*Assistant Examiner* — Hilary L Johns
(74) *Attorney, Agent, or Firm* — Carlson, Gaskey & Olds, P.C.

(57) ABSTRACT

An exemplary vehicle assembly includes, among other things, a sensor device that detects a location of a structure outside a vehicle, a running board moveable between a stowed position and a deployed position. The deployed position is adjusted relative to the vehicle based on the location of the structure detected by the sensor. An exemplary running board deploying method includes, among other things, detecting a location of a structure outside a vehicle, and transitioning a running board from a stowed position to a deployed position. The deployed position is adjusted relative to the vehicle based on the location of the structure.

19 Claims, 3 Drawing Sheets

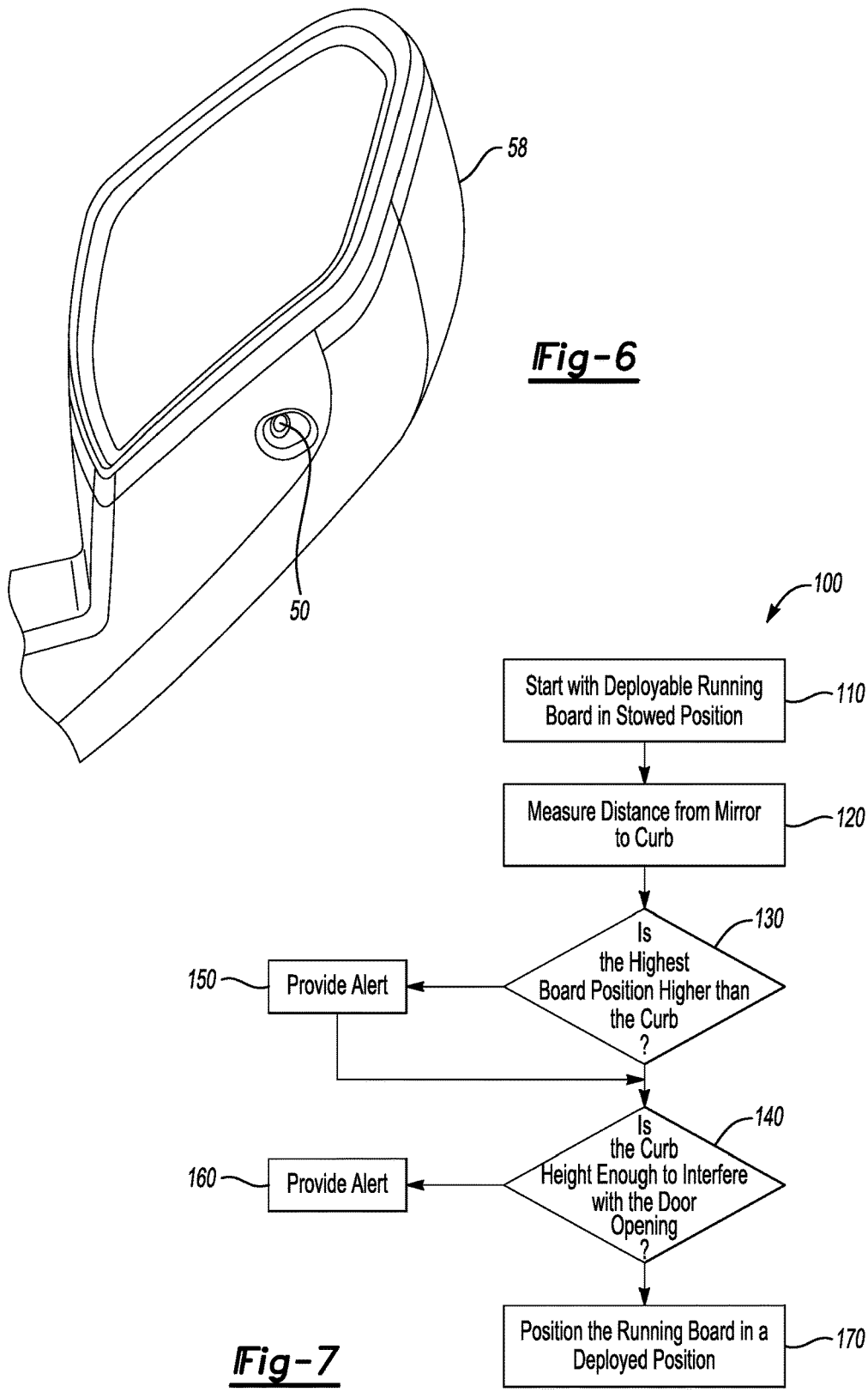

DEPLOYABLE RUNNING BOARD

TECHNICAL FIELD

This disclosure relates generally to a deployable running board that moves to different deployed positions relative to a vehicle based on a location of a structure outside the vehicle.

BACKGROUND

Sport utility vehicles (SUVs) and other vehicles, such as four wheel drive (4WD) vehicles, have a relatively high ground clearance, meaning the floor is at a relatively high elevation above the ground. The increased ground clearance makes it difficult for some users to enter and exit the vehicle.

Running boards are known, and have been used to provide assistance for entering and exiting vehicles with a high ground clearance. Some deployable running board assemblies (sometimes referred to as power running board assemblies or electric running board assemblies) include a running board that is pivotally connected the vehicle by one or more linkages. The linkages are driven by an actuator, which together are configured to move the running board between a stowed position (sometimes referred to as a "retracted" position) and a deployed position.

SUMMARY

A vehicle assembly according the an exemplary aspect of the present disclosure includes, among other things, a sensor device that detects a location of a structure outside a vehicle, and a running board moveable between a stowed position and a deployed position. The deployed position is adjusted relative to the vehicle based on the location of the structure detected by the sensor.

In a further non-limiting embodiment of the foregoing assembly, the structure is a curb.

In a further non-limiting embodiment of any of the foregoing assemblies, the curb is elevated relative to a road surface. The vehicle is disposed on the road surface.

In a further non-limiting embodiment of any of the foregoing assemblies, the location of the structure comprises a distance between a side mirror of the vehicle and a vertically uppermost surface of the structure.

In a further non-limiting embodiment of any of the foregoing assemblies, the vehicle is moveable between a kneeled position and a driving position. The distance is when the vehicle is in the kneeled position.

A further non-limiting embodiment of any of the foregoing assemblies includes a step surface of the running board. Adjustments to the deployed position change a distance between the step surface and a door sill of the vehicle.

A further non-limiting embodiment of any of the foregoing assemblies includes a bottom surface of the running board that is opposite a step surface of the running board. Adjustments to the deployed position change a distance between the bottom surface and the structure.

A further non-limiting embodiment of any of the foregoing assemblies includes a motor configured to move the running board back and forth between the stowed position and the deployed position.

In a further non-limiting embodiment of any of the foregoing assemblies, the sensor device is disposed within a side mirror of the vehicle.

In a further non-limiting embodiment of any of the foregoing assemblies, the sensor device is an ultrasonic sensor.

In a further non-limiting embodiment of any of the foregoing assemblies, the vehicle is an autonomous vehicle.

A running board deploying method according to another exemplary aspect of the present disclosure includes, among other things, detecting a location of a structure outside a vehicle, and transitioning a running board from a stowed position to a deployed position. The deployed position is adjusted relative to the vehicle based on the location of the structure.

In a further non-limiting embodiment of the foregoing method, the location is a distance between a portion of the vehicle and a vertically uppermost surface of the structure.

In a further non-limiting embodiment of any of the foregoing methods, the portion is a side mirror of the vehicle and the structure is a curb.

In a further non-limiting embodiment of any of the foregoing methods, the running board is spaced a first distance from the structure when the running board is in the deployed position, and the running board is moveable to another deployed position where the running board is spaced a different, second distance from the structure.

A further non-limiting embodiment of any of the foregoing methods includes moving the vehicle from a driving position to a kneeled position prior to the transitioning.

In a further non-limiting embodiment of any of the foregoing methods, a step surface of the running board is vertically positioned midway between a vertically uppermost portion of the structure and a door sill when the running board is in first deployed position.

In a further non-limiting embodiment of any of the foregoing methods, the detecting comprises projecting an ultrasonic beam from an area of the vehicle to the structure.

A further non-limiting embodiment of any of the foregoing methods includes, based on the location, maintaining the running board in the stowed position based on the location instead of transitioning the running board to the deployed position.

A further non-limiting embodiment of any of the foregoing methods includes, based on the location, communicating an alert to reposition the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 6 illustrates a perspective view of a side mirror of the vehicle of FIG. 2.

FIG. 7 illustrates a flow of a method of deploying the deployable running board according to an exemplary aspect of the present disclosure.

DETAILED DESCRIPTION

This disclosure relates generally to a deployable running board. In particular, the disclosure relates to a deployable running board that can move to different deployed positions in response to the location of structures outside the vehicle. Positioning the deployable running board in different deployed positions can, among other things, facilitate an occupant using the deployable running board when entering or exiting the vehicle.

Figure 1:
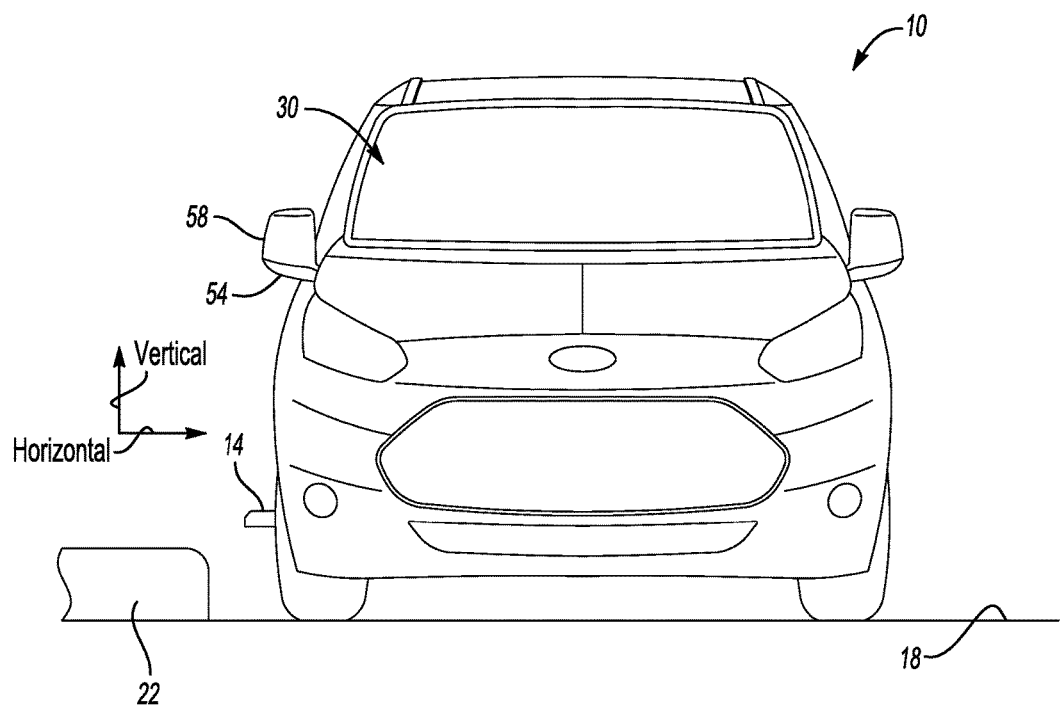
FIG. 1 illustrates a front view of a vehicle according to an exemplary aspect of the present disclosure where the vehicle is parked near a curb and has a deployable running board positioned in a deployed position.
Figure 2:
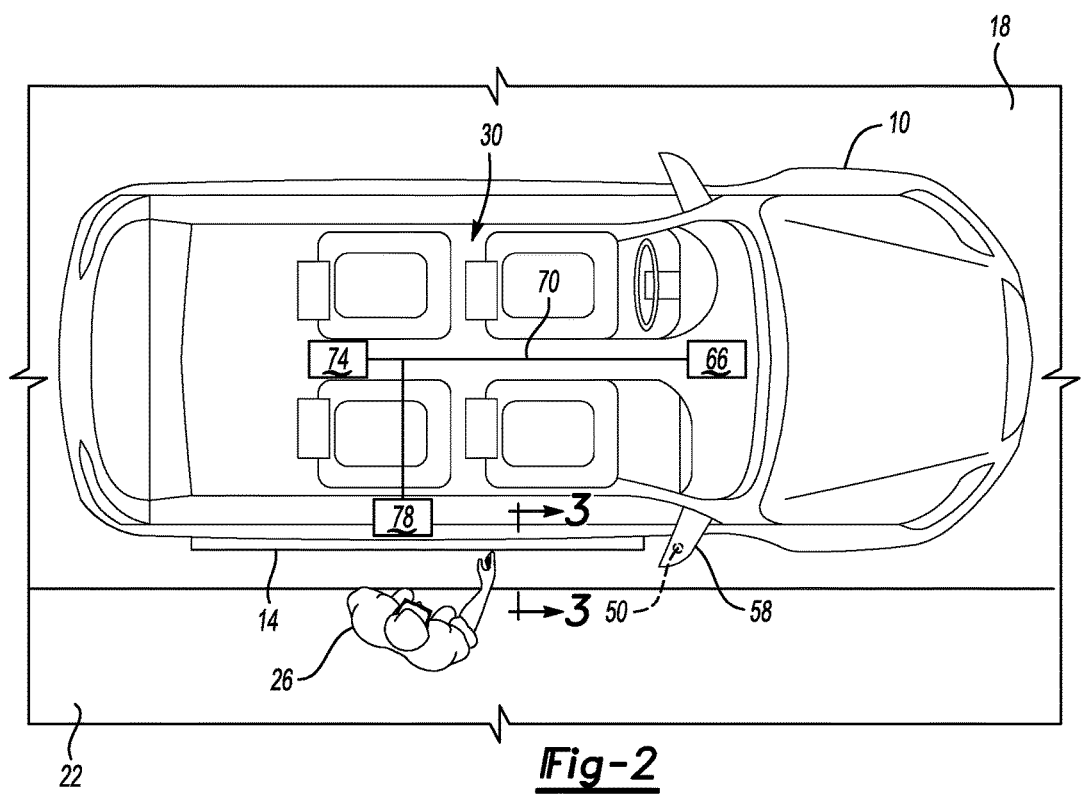
FIG. 2 illustrates a schematic top view of FIG. 1 with selected portions removed for clarity.
Figure 3:
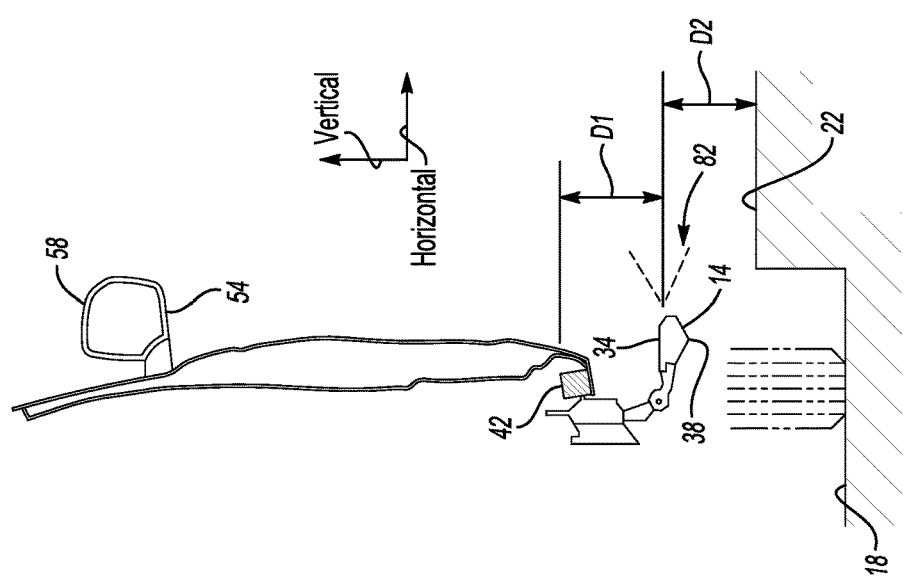
FIG. 3 illustrates a section view at line 3-3 in FIG. 2 with the deployable running board in the deployed position.

With reference to FIGS. 1-3, an exemplary vehicle 10 includes a running board 14, which is shown in a deployed position. The vehicle 10 is disposed on a road surface 18 adjacent a curb 22. A user 26 can step on the running board 14 when moving between a passenger cabin 30 of the vehicle 10 and the curb 22 through an open side door of the vehicle 10. The curb 22 is elevated vertically relative to the road surface 18. For purposes of this disclosure, vertical is with reference to the road surface 18 or ground, and the ordinary orientation of the vehicle 10 during operation.

The running board 14 is on a passenger side of the vehicle 10. Another deployable running board could be included on a driver side of the vehicle 10.

The running board 14 has a step surface 34 and a bottom surface 38 opposite the step surface 34. When entering the passenger cabin 30, the user 26 steps from the curb 22 onto the step surface 34 and then onto a door sill 42 of the vehicle 10. When exiting the passenger cabin 30, the user 26 steps from the door sill 42, to the step surface 34, and then onto the curb 22.

When the running board 14 is in the deployed position of FIGS. 1-3, the step surface 34 is spaced vertically a first distance D1 from the door sill 42, and is spaced vertically a second distance D2 from the curb 22.

In the exemplary deployed position, the first distance D1 is nominally the same as the second distance D2. The step surface 34 of the running board 14 is thus positioned midway between the door sill 42 and a vertically uppermost portion of the curb 22. Such positioning can facilitate entering and exiting the vehicle 10 using the running board 14.

Figure 4:
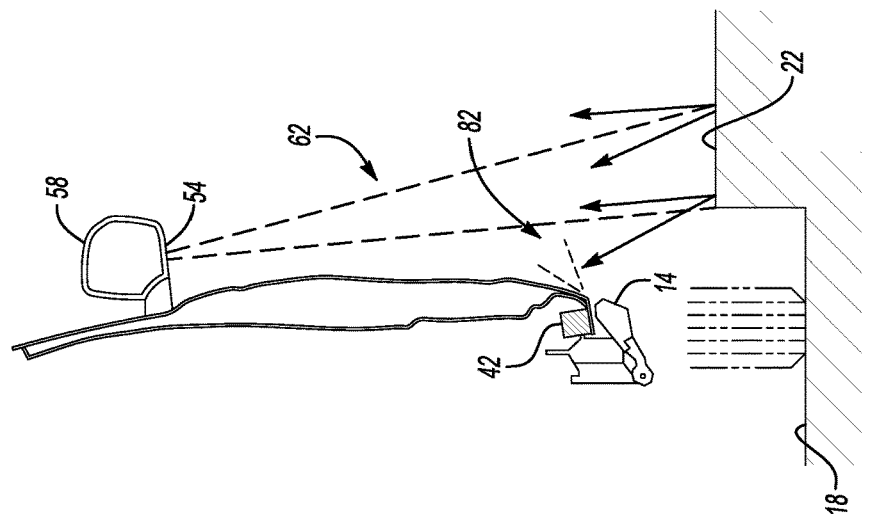
FIG. 4 illustrates a section view at line 3-3 in FIG. 2 with the deployable running board in a stowed position.

The running board 14 is moveable between the deployed position shown in FIGS. 1-3 and a stowed position shown in FIG. 4. The running board 14 can be moved to the stowed position after the user 26 has entered or exited the passenger cabin 30, and when the vehicle 10 is driven.

Figure 5:
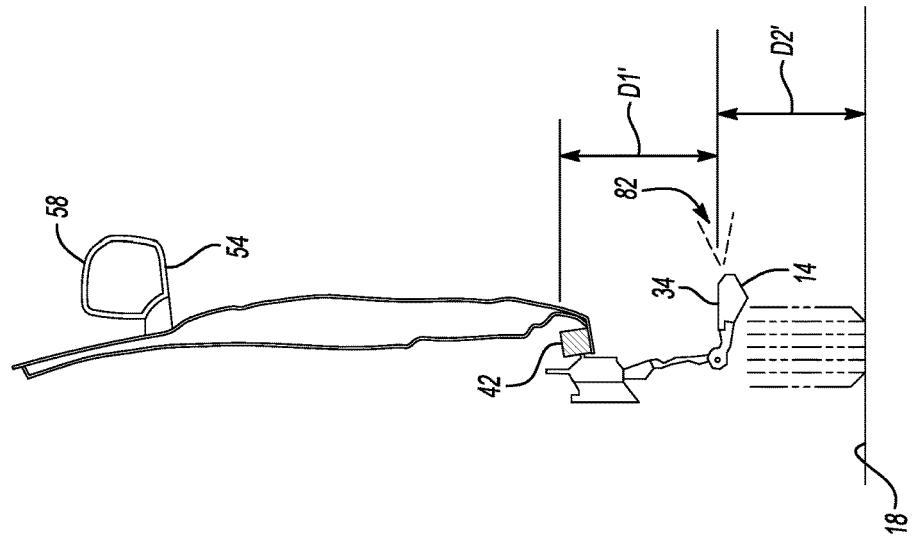
FIG. 5 illustrates a section view at line 3-3 in FIG. 2 with the deployable running board in the deployed position and the vehicle is moved to another location away from the curb.

The running board 14 is also moveable to deployed positions other than the deployed position of FIGS. 1-3, such as the deployed position of FIG. 5 where the vehicle 10 is not parked adjacent to the curb 22. In the deployed position of FIG. 5, the step surface 34 is spaced vertically a first distance D1' from the door sill 42, and the step surface 34 is spaced vertically a second distance D2' from the road surface 18. The first distance D1' in FIG. 5 is greater than the first distance D1 in FIG. 3, and the second distance D2' is greater than the second distance D2 in FIG. 3.

In the exemplary deployed position of FIG. 5, the first distance D1' is nominally the same as the second distance D2'. The step surface 34 of the running board 14 is thus positioned midway between the door sill 42 and the road surface 18. Other deployed positions that do not result in the step surface 34 being midway between the door sill 42 and the road surface 18 (or curb) are possible and fall within the scope of this disclosure.

As can be appreciated, a distance between the bottom surface 38 of the running board 14 and the structure outside the vehicle 10 can be varied by changing the deployed position of the running board 14.

In the exemplary non-limiting embodiment, the running board 14 can be moved from the stowed position of FIG. 4 to the deployed position of FIG. 3, the deployed position of FIG. 5, or some other deployed position based on a location of a structure outside the vehicle 10. The structure can be the curb 22 shown in FIG. 3, the road surface as showing in FIG. 5, or some other structure.

When the location of the structure is vertically closer to the door sill 42, such as the location of the curb 22 relative to the road surface 18, the running board 14 is not deployed as far as when the structure is vertically further from the door sill 42.

With reference to FIG. 6 and continuing reference to FIGS. 1-3, the vehicle 10 includes a sensor device 50 that is used to detect the location of the structure outside the vehicle 10. The sensor device 50, in an exemplary non-limiting embodiment, includes an ultrasonic sensor housed within a downwardly facing surface 54 of a side mirror 58 of the vehicle 10. The sensor device 50 can be recessed within the surface 54 to protect the sensor device 50 from snow, dirt, damage, etc. In other examples, the sensor device 50 could be mounted on the running board 14, or in another position on the vehicle 10. In some autonomous vehicles, the sensor device 50 could be mounted together with a Light Detection and Ranging (LIDAR) sensor.

After the vehicle 10 is parked and prior to fully deploying the running board 14, the exemplary sensor device 50 can project an ultrasonic beam 62 toward the running board 14 and toward structures adjacent to this area of the vehicle 10. The ultrasonic beam 62 can be a narrow beam, for example. Reflections from the ultrasonic beam 62 are received by the sensor device 50 and can be used to establish a location of the structure near the vehicle 10. A person having skill in this art could understand how to select a sensor suitable for determining distances between a structure and the sensor.

In some examples, the reflections help to establish a distance between the side mirror 58 and a surface of the structure that the user 26 will use when entering or exiting the vehicle 10, such as a vertically uppermost surface of the curb 22.

Based on the location of the structure outside the vehicle 10, the running board 14 can be deployed to the deployed position of FIG. 3, the deployed position of FIG. 5, or to some other deployed position. Because the deployed position is based on the location or the structure outside the vehicle 10, the deployed position can be optimized to facilitate the user entering and exiting the vehicle using the running board 14.

In some examples, the sensor device 50 could reveal that the structure outside the vehicle 10 will interfere with movement of the running board 14 to any deployed position, such as when the curb 22 is raised considerably relative to the road surface 18. In such examples, the running board 14 can be automatically maintained in the stowed position as the user 26 enters or exits the passenger cabin 30.

In some examples, the sensor device 50 could reveal that the structure outside the vehicle 10 will interfere with opening of a vehicle side door, such as when the curb 22 is raised considerably relative to the road surface 18. In such examples, an alert could be provided to a driver of the vehicle 10 indicating that the vehicle 10 should be moved to permit opening of the side door. If the vehicle 10 is a driverless autonomous vehicle, the vehicle 10 could automatically move to a new position appropriate for opening the vehicle side door.

With reference again to FIG. 2, a control system of the vehicle 10 includes the sensor device 50, an Audio Visual (AV) module 66, a bus 70, an air suspension module 74, and a power running board control module 78. The control system can adjust the deployed position of the deployable running board in response to data received through the sensor device 50 revealing a location of a structure, such as the curb 22, outside the vehicle 10.

The bus 70 of the control system can be a controller area network (CAN) bus, a local interconnect network (LIN) bus, or a combination of these.

The control system and its various modules can include a processor, memory, and one or more input and/or output (I/O) device interface(s) that are communicatively coupled via a local interface. The local interface can include, for example but not limited to, one or more of the buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The control system can include a hardware device for executing software, particularly software stored in memory that may include one or more separate programs, each of which includes an ordered listing of executable instructions for implementing logical functions. The control system can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

Alerts indicating that the running board 14 should not be deployed, or that the vehicle 10 should be moved, can be displayed or otherwise presented to a driver through the AV module 66. If the running board 14 can be deployed, the power running board control module 78 causes a motor to be powered to transition the running board 14 from the stowed position to the desired deployed position. The motor can also be used to transition the running board 14 from the desired deployed position back to the stowed position. The deployed position of the running board 14 relative to the vehicle 10 can be adjusted by, for example, monitoring a hall effect sensor and controlling the motor in response to the monitoring. A person having skill in this art and the benefit of this disclosure could understand how to cause a motor to transition a deployable running board between a stowed position to a deployed position.

The air suspension module 74 of the example vehicle 10 can cause the vehicle to transition from a driving position to a kneeled position. In the kneeled position, suspension components have adjusted to lower the door sill 42 (FIG. 4) vertically. After the vehicle 10 has moved to the kneeled position, the control system of the vehicle 10 can select a deployed position and cause the running board 14 to move to the selected deployed position.

In some examples, the running board 14 includes lights that can be selectively activated by, for example, the power running board control module 78 in one or more colors. A light beam 82 can propagate from the lights when the lights are activated. The lights could, for example, flash with an amber color when a structure outside the vehicle 10 is preventing the running board 14 from deploying. The lights could, for example, flash with an amber color as the running board 14 is deploying and then, when the running board 14 reaches the desired deployed position, transition to a white, non-flashing color.

With reference now to FIG. 7 and continuing reference to FIG. 2, the control system, in an exemplary embodiment, deploys the running board 14 according to a running board deployment method 100. The method 100 starts at a step 110 and then moves to a step 120, where the method 100 measures a distance between the side mirror 58 and the curb 22. The measurement in the step 120 could occur after the suspension system of the vehicle 10 has moved the vehicle 10 from the driving position to the kneeled position.

Next, the method 100 moves to a step 130 where the method 100 calculates whether or not the vertically highest position for the running board 14 in the deployed position is higher than the curb 22, or otherwise will not contact the curb 22. Contact between the curb 22 and the running board 14 could damage the running board 14.

If, at the step 130, moving the running board 14 to a deployed position is possible, the method 100 moves from the step 130 to the step 140.

If the running board 14 cannot move a deployed position without contacting the curb 22, the method 100 moves to a step 150 where the method 100 provides an alert that the running board 14 will not be moved from the stowed position to any deployed position. The alert could be an audible alarm that sounds within the passenger cabin 30, for example. After initiating the alert, the method 100 moves from the step 150 to the step 140. Providing an alert that the running board 14 will not be deployed can help to avoid a situation where a distracted user assumes the running board 14 is deployed and steps out of the passenger cabin 30 expecting to contact the running board 14, which could cause the distracted user to slip.

At the step 140, the method 100 calculates whether or not the curb 22 is so tall that the curb 22 will interfere with opening a side door of the vehicle 10. As can be appreciated, a side door swinging to an open position could contact a curb that extends vertically higher than a vertically lower edge of the side door. Contact between the curb 22 and the side door could damage the side door.

If the step 140 assesses that the side door will contact the curb 22 when opening, the method 100 moves to a step 160 where the method 100 provides an alert that the vehicle 10 must be moved to permit the side door opening. In response the alert, a driver could move the vehicle 10 to another location. In response to the alert, the vehicle 10, if an autonomous vehicle, could automatically reposition itself.

If the step 140 assesses that the side door can open without contacting the curb 22, the method 100 moves to a step 170. At the step 170, the method 100 commands the power running board control module 78 to move the running board 14 from the stowed position to a deployed position. The deployed position could be calculated to position the step surface 34 of the running board 14 is nominally positioned vertically halfway between a top surface of the curb 22 and a top surface of the door sill 42.

Features of the disclosed examples include a deployable running board that is automatically positioned relative to a vehicle in response to a location of a structure outside the vehicle. The automatic positioning can facilitated a user entering and exiting a passenger cabin of a vehicle.

The preceding decryption is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a sensor device that detects a location of a structure outside a vehicle; and
   a running board moveable between a stowed position and a deployed position, the deployed position is adjusted relative to the vehicle based on the location of the structure detected by the sensor, the running board spaced a distance from the structure when in the deployed position.

2. The vehicle assembly of claim 1, wherein the structure is a curb.

3. The vehicle assembly of claim 2, wherein the curb is elevated relative to a road surface, the vehicle disposed on the road surface.

4. The vehicle assembly of claim 2, wherein the running board does not contact the curb when in deployed position.

5. The vehicle assembly of claim 1, wherein the location of the structure comprises a distance between a side mirror of the vehicle and a vertically uppermost surface of the structure.

6. The vehicle assembly of claim 5, wherein the vehicle is moveable between a kneeled position and a driving position, wherein the distance is when the vehicle is in the kneeled position.

7. The vehicle assembly of claim 1, further comprising a step surface of the running board, wherein the adjustments to the deployed position change a distance between the step surface and a door sill of the vehicle.

8. The vehicle assembly of claim 1, further comprising a bottom surface of the running board that is opposite a step surface of the running board, wherein the adjustments to the deployed position change a distance between the bottom surface and the structure.

9. The vehicle assembly of claim 1, further comprising a motor configured to move the running board back and forth between the stowed position and the deployed position.

10. The vehicle assembly of claim 1, wherein the sensor device is disposed within a side mirror of the vehicle.

11. The vehicle assembly of claim 1, wherein the sensor device is an ultrasonic sensor.

12. The vehicle assembly of claim 1, wherein the vehicle is an autonomous vehicle.

13. The vehicle assembly of claim 1, wherein the distance is greater than zero.

14. The vehicle assembly of claim 1, wherein spacing the running board a distance from the structure provides an open area vertically between a bottommost surface of the running board and the structure.

15. The vehicle assembly of claim 1, wherein the distance is a vertical distance.

16. The vehicle assembly of claim 1, wherein the distance is a first distance between a step surface of the running board and the structure, wherein the step surface is spaced a second distance from a door sill of the vehicle when in the deployed position, the first distance nominally the same as the second distance.

17. The vehicle assembly of claim 1, wherein the distance between a bottom surface of the running board and the structure outside the vehicle can be varied by adjusting the deployed position.

18. A vehicle assembly, comprising:
    a sensor device that detects a location of a structure outside a vehicle; and
    a running board moveable between a stowed position and a deployed position without contacting the structure, the deployed position is adjusted relative to the vehicle based on the location of the structure detected by the sensor.

19. The vehicle assembly of claim 18, wherein the structure is a curb, and a bottommost surface of the running board is vertically spaced from a top surface of the curb when the running board is in the deployed position.

* * * * *